(12) United States Patent
Frankowski et al.

(10) Patent No.: US 8,992,819 B2
(45) Date of Patent: Mar. 31, 2015

(54) METHOD FOR PRODUCING A WIND TURBINE ROTOR BLADE PART WITH A PREFABRICATED MAIN SPAR CAP

(75) Inventors: Marco Frankowski, Ostseebad Wustrow (DE); Dirk Austinat, Jarmen (DE)

(73) Assignee: Nordex Energy GmbH, Hamburg (DE)

( * ) Notice: Subject to any disclaimer, the term of this patent is extended or adjusted under 35 U.S.C. 154(b) by 281 days.

(21) Appl. No.: 13/569,820

(22) Filed: Aug. 8, 2012

(65) Prior Publication Data

US 2013/0056914 A1    Mar. 7, 2013

(30) Foreign Application Priority Data

Sep. 7, 2011   (EP) ..................................... 11007250

(51) Int. Cl.
| | |
|---|---|
| *B29C 51/10* | (2006.01) |
| *B29C 70/54* | (2006.01) |
| *B29C 70/44* | (2006.01) |
| *F03D 1/06* | (2006.01) |
| *B29C 70/86* | (2006.01) |
| *B29L 31/08* | (2006.01) |

(52) U.S. Cl.
CPC ............... *B29C 70/546* (2013.01); *B29C 70/44* (2013.01); *F03D 1/0675* (2013.01); *F05B 2280/6003* (2013.01); *F05B 2280/6015* (2013.01); *F05B 2280/702* (2013.01); *B29L 2031/082* (2013.01); *B29C 70/865* (2013.01); *Y02E 10/721* (2013.01)
USPC .......................................... 264/511; 264/571

(58) Field of Classification Search
None
See application file for complete search history.

(56) References Cited

U.S. PATENT DOCUMENTS

| | | | |
|---|---|---|---|
| 8,216,500 B2 * | 7/2012 | Olesen et al. ................. | 264/258 |
| 2007/0251090 A1 * | 11/2007 | Breugel et al. ............... | 29/889.7 |
| 2010/0209651 A1 | 8/2010 | Mikkelsen et al. | |
| 2011/0146896 A1 | 6/2011 | Schibsbye | |

FOREIGN PATENT DOCUMENTS

| | | |
|---|---|---|
| EP | 0 525 263 A1 | 2/1993 |
| WO | WO 2007/038930 A1 | 4/2007 |

* cited by examiner

*Primary Examiner* — Monica Huson
(74) *Attorney, Agent, or Firm* — Walter Ottesen P.A.

(57) ABSTRACT

Method for producing a wind turbine rotor blade part with a prefabricated main spar cap, comprising the following steps: providing a mold having a blade-root end and with a blade-tip end, inserting at least one outer root reinforcement layer (28) made of a fibrous material into the mold, arranging the prefabricated main spar cap on the at least one outer root reinforcement layer, arranging, in the mold, at least one inner root reinforcement layer made of a fibrous material on the main spar cap, closing the mold, extracting the air from the mold through at least one extraction channel arranged at a lateral distance from the main spar cap, feeding a liquid plastics material through a first sprue channel which has a plurality of outlet openings below the main spar cap, feeding a liquid plastics material through a second sprue channel which has a plurality of outlet openings above the main spar cap.

15 Claims, 2 Drawing Sheets

METHOD FOR PRODUCING A WIND TURBINE ROTOR BLADE PART WITH A PREFABRICATED MAIN SPAR CAP

CROSS REFERENCE TO RELATED APPLICATION

This application claims priority of European patent application No. 11007250.1, filed Sep. 7, 2011, the entire content of which is incorporated herein by reference.

FIELD OF THE INVENTION

The invention relates to a method for producing a wind turbine rotor blade part with a prefabricated main spar cap.

Wind turbine rotor blade parts are usually produced from fiber-reinforced plastics materials, for example from a combination of glass fibers with polyester resins or with epoxy resins.

BACKGROUND OF THE INVENTION

The publication EP 0 525 263 A1 discloses a vacuum infusion process for producing fiber-reinforced plastics parts. In the known process, a plurality of layers of a fibrous material are inserted into a mold. Below and above the layers of the fibrous material there are respectively distribution media separated from the layers of the fibrous material by further layers made of what are known as peel-off plies. At the underside of the mold, below the lower distribution medium, there is a sprue channel, and above the upper distribution medium there is an extraction channel. The airtight sealed mold is evacuated by way of the extraction channel, and a liquid plastics material is sucked through the sprue channel here. This material becomes distributed via the lower distribution medium over the entire area of the mold and completely penetrates the layers of the fibrous material. After the plastics material has hardened, the distribution media and the peel-off plies are removed from the fiber-reinforced plastic.

Document WO 2007/038930 A1 has disclosed another method for producing fiber-reinforced plastics parts. In the known method, a porous material is used as distribution medium and can enter into bonding with the plastics material infused. The distribution medium remains in the finished part after the plastic has hardened. In particular, it can form a surface of the part.

In particular in the case of very large rotor blades with a total length of, for example, 50 m or more, it is advisable for reasons of strength to use not only glass-fiber-reinforced plastics materials but also fibrous materials with even higher strength. This is particularly true of the main spar caps which extend in the longitudinal direction of the rotor blades and which form the central load-bearing structures of the rotor blade and absorb the bending moments that arise. Carbon fiber-reinforced main spar caps are often used for rotor blades of this type. The carbon fibrous materials are very expensive, and because their properties, in particular their flow resistance with respect to the liquid matrix materials, differ from those of glass fibrous materials, it is often advisable that carbon fiber-reinforced main spar caps are prefabricated. They can by way of example be produced in a separate mold in a first vacuum infusion process. Once the plastics material has hardened, the prefabricated main spar cap can be removed from said mold and inserted into the mold for producing the half shell of the wind turbine rotor blade. The other components of the half shell are then added in a second manufacturing step and are saturated with a liquid plastics material in a further vacuum infusion process and thus bonded to the prefabricated main spar cap.

The presence of the prefabricated main spar cap in the mold, that is, of a large body which cannot be saturated by the liquid plastics material, places particular requirements on the infusion procedure. Here again, complete saturation of the fibrous materials has to be ensured. Air inclusions have to be avoided, as also do large-volume aggregations of plastic.

In order to obtain a dependable manufacturing process in this situation, experience has shown that it is advisable to arrange, in the surroundings of the prefabricated main spar cap, large-surface-area distribution media which promote rapid and uniform distribution of the liquid plastics material. These structurally irrelevant distribution media are completely saturated by the plastics material and remain in the part once the plastics material has hardened. This considerably increases the total weight of the rotor blade, and higher loads arise, in particular in the region of the connection of the rotor blade to the hub.

SUMMARY OF THE INVENTION

On the basis thereof it is the object of the invention to provide a method for producing a wind turbine rotor blade part with a prefabricated main spar cap, while achieving reduced part weight, in a low-risk process.

The method serves for producing a wind turbine part with a prefabricated main spar cap and comprises the following steps:

providing a mold having a blade-root end and a blade-tip end, inserting at least one outer root reinforcement layer made of a fibrous material into the mold, arranging the prefabricated main spar cap on the at least one outer root reinforcement layer, arranging at least one inner root reinforcement layer made of a fibrous material on the main spar cap, closing the mold, extracting the air from the mold through at least one extraction channel arranged at a lateral distance from the main spar cap, feeding a liquid plastics material through a first sprue channel which has a plurality of outlet openings below the main spar cap, feeding a liquid plastics material through a second sprue channel which has a plurality of outlet openings above the main spar cap.

The sequence of the steps stated for the method can of course be varied at least to some extent, and it is of course possible to execute further steps of the method between the individual steps. By way of example, further layers of material can be inserted into the mold.

The mold provided can have an inner surface which defines an exterior surface of the wind turbine rotor blade part. The length and width of the mold in essence correspond to the length and, respectively, the width of the part, or are slightly greater. The length of the mold can by way of example be 30 m or more, 40 m or more, or 50 m or more, and the width can by way of example be 2 m or more or 3 m or more. The wind turbine rotor blade part can in particular involve a shell of a rotor blade or a prefabricated part which includes, or is composed of, a main spar cap and a root region of the rotor blade.

The mold has a blade root end and a blade tip end. If the wind turbine rotor blade part to be manufactured in the mold involves a half shell, these ends of the mold generally serve for manufacturing those sections of the half shell that form parts of the blade root and of the blade tip. If the part is not a (complete) half shell, the ends of the mold can also represent merely those regions of the mold in which the part sections in the vicinity of the blade root and, respectively, of the blade tip of the finished rotor blade are manufactured.

The root reinforcement layers are made of a fibrous material, for example of glass fibers. It is possible to use uni-, bi- or multidirectional laid scrims of the fibrous material. The root reinforcement layers can extend from a blade root end of the mold, that is, from the blade root of the part to be produced, in a direction toward the blade tip. They generally do not extend over the entire length of the part, but instead terminate at a certain radius position. The root reinforcement layers reinforce the part in the region of the blade root and provide optimal transmission of the loads from the main spar cap into the blade root. For reasons of strength, the main spar cap here is enclosed between the inner and outer root reinforcement layers.

The fact that the at least one outer root reinforcement layer is inserted into the mold does not necessarily imply that it is directly adjacent to the internal area of the mold. Instead, additional materials can be arranged between the mold and the at least one outer root reinforcement layer, for example a root insert which will be described in more detail, a gel coat, or any other fibrous material. The at least one outer root reinforcement layer can be inserted into the mold in a region at the blade root end.

The prefabricated main spar cap is arranged on the at least one outer root reinforcement layer. It is possible that only a part of its total length lies on the outer root reinforcement layer and that another longitudinal section thereof, in particular at the blade-tip end, lies on an internal area of the mold. It is also possible, of course, to arrange further layers of material between the mold and the section of the prefabricated main spar cap and/or between the at least one outer root reinforcement layer and the prefabricated main spar cap.

Once the main spar cap has been arranged, at least one inner root reinforcement layer of a fibrous material is arranged on the prefabricated main spar cap. The information given relating to the outer root reinforcement layer applies to the material of the inner root reinforcement layer and to arrangement of the material in the blade root region of the mold. It is also possible here, of course, to arrange further materials between the main spar cap and the at least one inner root reinforcement layer. The at least one inner root reinforcement layer can be inserted into the mold in a region at the blade root end.

The at least one outer root reinforcement layer and/or the at least one inner root reinforcement layer can extend over the entire width of the mold, and the cross section of the part at its blade-root end here can be in essence semicircular, and the root reinforcement layers can then extend over the entire semicircle.

Once the inner and outer root reinforcement layers, and the main spar cap, and also optionally further materials, have been arranged, the mold is closed. The mold is closed so as to be airtight, for example with a vacuum film. To this end, the entire arrangement can be covered by the film, and edges of the mold can be bonded to the vacuum film so as to be airtight. The air is then extracted from the mold through the at least one extraction channel, thus generating a vacuum or a markedly subatmospheric pressure within the mold.

Simultaneously or subsequently, a liquid plastics material that hardens is fed through a first sprue channel and through a second sprue channel, and infused into the evacuated mold. The liquid plastics material can by way of example be a polyester resin and/or an epoxy resin. The feed can by way of example be achieved by connecting the sprue channels to a container containing the liquid plastics material, for example by way of a hose. The connection and the subatmospheric pressure prevailing within the mold then cause the plastics material to be sucked through the sprue channels and to pass into the interior of the mold.

The first sprue channel has a plurality of outlet openings below the main spar cap and/or below the root material and/or below a root insert. The first sprue channel and the plurality of outlet openings thereof can be integrated into the mold. The outlet openings can in particular terminate flush with an inner area of the mold. The outlet openings have been arranged below the main spar cap, and they can be at a distance from the main spar cap here, and "below" here relates to the gravitational force prevailing during the production of the part.

A liquid plastics material, in particular a liquid plastics material the same as that fed through the first sprue channel, is then fed through a second sprue channel which has a plurality of outlet openings above the main spar cap. "Above" here again relates to the direction of gravitational force. The outlet openings of the second sprue channel can likewise be at a distance from the main spar cap.

The outlet openings of the first sprue channel can be arranged directly adjacent to the at least one outer root reinforcement layer. However, further layers can also be arranged therebetween, an example being a distribution medium or a peel-off ply. The outlet openings of the second sprue channel can likewise be arranged immediately adjacent to the at least one inner root reinforcement layer. However, here again it is also possible to arrange additional layers therebetween, in particular a distribution medium or a peel-off ply.

The at least one extraction channel is arranged at a lateral distance from the main spar cap. "Lateral" relates to the longitudinal direction of the main spar cap and of the mold. By way of example, the at least one extraction channel can be arranged at a lateral edge of the mold. In particular, two extraction channels can be used, respectively, one at each lateral edge of the mold.

By virtue of the feed in the invention of the liquid plastics material through a first and a second sprue channel below and above the main spar cap, and extraction of the air by way of an extraction channel arranged laterally with respect to the main spar cap, dependable saturation of the layers surrounding the main spar cap is achieved. Flow paths obtained are shorter than in a conventional arrangement of the sprue channels exclusively on the upper side of the materials inserted into the mold. In particular, the region below the main spar cap is rapidly and dependably saturated via the outlet openings located there and belonging to the first sprue channel. This is also true when consideration is given to the considerable compaction experienced by the at least one outer root reinforcement layer below the main spar cap on evacuation of the mold, because the main spar cap arranged thereabove acts as a pressure element.

In one embodiment, the outlet openings of the first sprue channel are distributed centrally below the main spar cap and above a longitudinal section of the mold. The central arrangement promotes rapid and uniform distribution of the plastics material below the main spar cap.

In one embodiment, a plurality of outer root reinforcement layers are mutually superposed in the longitudinal section, and have a total thickness of 1 mm or more. In particular in longitudinal sections with a plurality of root reinforcement layers, complete saturation with the plastics material is problematic. It is therefore preferable that the longitudinal section in which the outlet openings of the first sprue channel are arranged is arranged in these regions.

In one embodiment, the longitudinal section extends only over a part of the total length of the main spar cap. In other longitudinal sections of the mold, where no, or only a small number of, outer root reinforcement layers are present, there is no need for separate feed by way of the first sprue channel. The formation of outlet openings in the regions can therefore be omitted in order to obtain a clean surface of the part in this region.

In one embodiment, a plurality of inner and/or outer root reinforcement layers are mutually superposed, and the total thickness of these decreases respectively in a longitudinal section of the part with increasing distance from the blade-root end. Root reinforcements which are tapered in this manner are advantageous for reasons of strength.

In one embodiment, a thickness of the main spar cap in a longitudinal section of the part increases with increasing distance from the blade-root end. In particular, the main spar cap can flatten toward the blade-root end and optionally can terminate at a distance from the blade-root end of the part. This promotes smooth transmission of force between the inner and outer root reinforcement layers on the one hand and the main spar cap on the other hand.

In one embodiment, the feed through the second sprue channel is started only after expiration of a period after the start of the feed through the first sprue channel. This chronological sequence of the feed can contribute to avoidance of air inclusions and to formation of uniform flow fronts, even when the plastics material is spread at different rates above and below the main spar cap.

In one embodiment, the period has been judged in such a way that when the feed through the second sprue channel is started, plastics material fed through the first sprue channel has become distributed below the main spar cap. The interval can in particular be judged on the basis of values obtained from experience. It is equally possible to use visual control by establishing when the plastics material fed through the first sprue channel appears laterally below the main spar cap. The feed by way of the second sprue channel can be started at this juncture. In this manner it is ensured that there are no residual air inclusions below the main spar cap which could possibly remain undiscovered during the remainder of the manufacturing process.

In one embodiment, prior to the insertion of the at least one outer root reinforcement layer, a prefabricated root insert is inserted at the blade root end of the mold. The prefabricated root insert is in particular made of a fiber-reinforced plastics material. It can, like the main spar cap, have been prefabricated in a separate mold. When the root insert is inserted into the mold for producing the part, the material of the root insert has already hardened. The root insert can in particular form a semicircle over the entire width of the mold at the blade root end and extend from the blade root end by way of example over a length in the range from 1 m to 4 m toward the blade tip. The use of prefabricated root inserts of this type is known and serves for further reinforcement of the blade root; this can be a requirement for sufficient load-bearing capability at a blade connection to a hub. Prefabricated root inserts of this type can by way of example be composed of 30 layers of a fibrous material or more, for example of from 50 to 70 layers. Prefabrication of these voluminous fiber-reinforced individual parts is advisable for cost reasons, but poses additional problems in the further production of the wind turbine rotor blade part, because the prefabricated root insert is similar to the main spar cap in providing a barrier to the liquid plastics material. The feed according to the invention of the liquid plastics material not only from the upper side but also through the first sprue channel promotes complete saturation even in the regions adjacent to the root insert, in particular in the transitional region relating to the main spar cap.

In one embodiment, the root insert and the main spar cap have been overlapped in a longitudinal section of the part. Between the root insert and the main spar cap there is the at least one outer root reinforcement layer, which has to be saturated by the liquid plastics material. This arrangement is advisable for strength reasons, but critical for the infusion of the liquid plastics material, because in the overlap region the liquid plastic has to be infused between two bodies which are not themselves susceptible to saturation. In the invention, the first sprue channel below the main spar cap promotes this process, and from that channel the plastics material can flow between the two individual parts mentioned.

In one embodiment, in the longitudinal section in which the root insert overlaps with the main spar cap, its dimension decreases with increasing distance from the blade-root end. This promotes uniform transmission of force.

In one embodiment, a distribution medium has been arranged between the root insert and the main spar cap. The distribution medium can be a porous and/or open-pored structure and/or a structure that forms cavities or that forms channels, where the structure promotes rapid and uniform distribution of the liquid plastics material in the layer formed by the distribution medium. The distribution medium remains in the part once the plastics material has hardened. It can be penetrated and wetted by the liquid plastics material and can enter into bonding therewith, in such a way that the layers adjacent to the distribution medium have been bonded firmly to one another once the plastics material has hardened. The distribution medium between root insert and main spar cap provides dependable saturation of the at least one outer root reinforcement layer arranged in this region.

It is preferable that the distribution medium is arranged exclusively between the two prefabricated parts mentioned. In addition, or as an alternative, a distribution medium can optionally be arranged in a longitudinal section which is below the main spar cap or below the at least one outer root reinforcement layer and which is adjacent to the region of overlap between root insert and main spar cap. The area of the distribution medium is preferably minimized and can by way of example be 2 m² or less.

In one embodiment, further layers of a fibrous material are inserted into the mold, and form the outer area of the wind turbine rotor blade part. In particular, a part designed as a half shell can be involved here. In particular, a glass fibrous material can be used for these further layers. The further layers can be laterally adjacent to the main spar cap, and the main spar cap here has lateral connecting sections with which the further layers are bonded. A particular possibility, during the prefabrication of the main spar cap, is that a fibrous material corresponding to the further layers is prefabricated together with the main spar cap made of another fibrous material, in such a way that the outer area of the external shell below the actual main spar cap and in the region of the laterally adjacent further layers is composed of a unitary material. The formation of the lateral connecting sections mentioned on the main spar cap promotes firm bonding to the further layers.

In one embodiment, the further layers are adjacent to a side of the root insert, the side being remote from the blade-root end, wherein at the side the root insert has a connecting section with which the further layers are bonded. This method is successful in achieving a bond between the root insert and the further layers that complies with stringent strength requirements.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
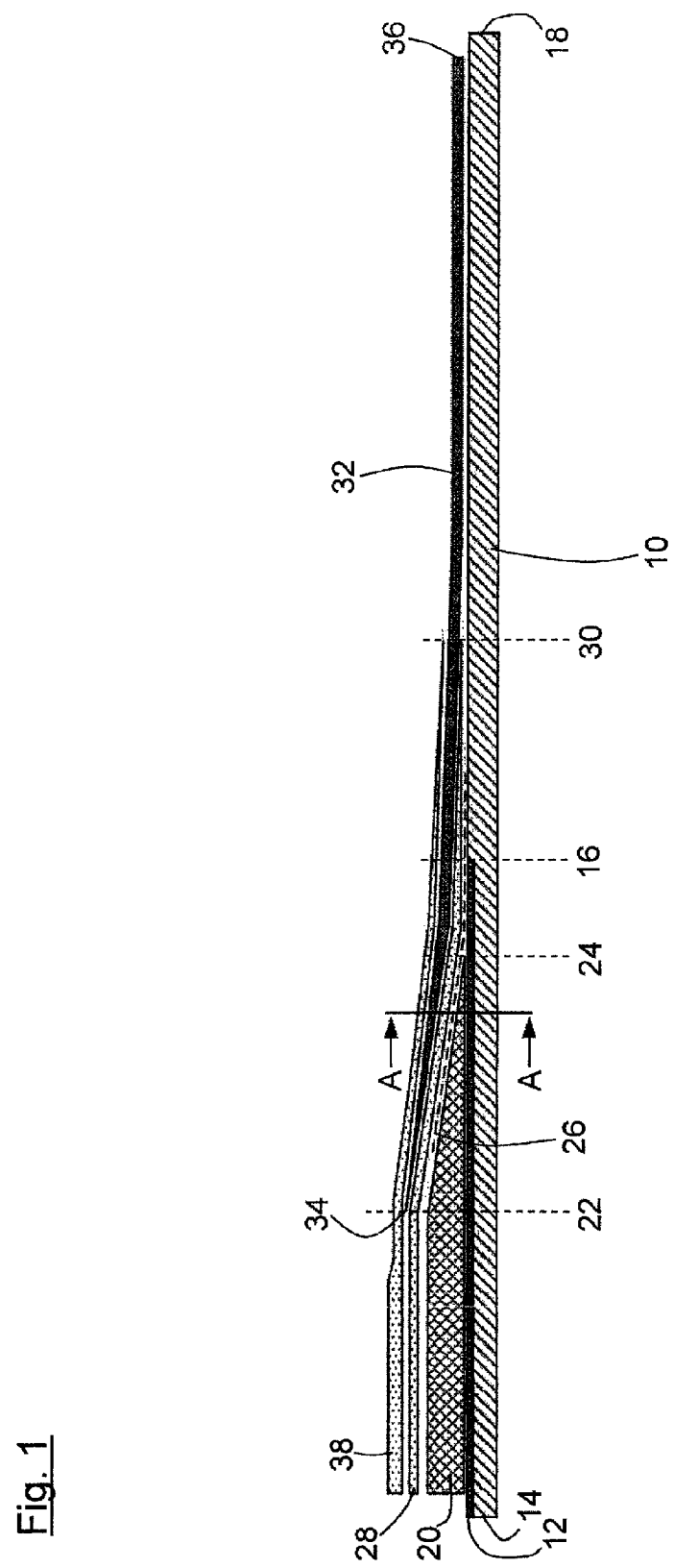
FIG. 1 is a simplified schematic diagram of a longitudinal section of a wind turbine rotor blade part in a mold, produced by the method of the invention; and, FIG. 2 is likewise a simplified schematic diagram of a cross section through the wind turbine rotor blade part of FIG. 1 along the sectional plane indicated by A-A in FIG. 1.

FIG. 1 shows a mold 10 for producing a wind turbine rotor blade part. The mold 10 has a first sprue channel 12, which extends from a blade root end 14 of the mold to a first radius position 16. The end of the mold 10 opposite to the blade root end 14 is termed blade tip end 18.

A root insert 20 has been inserted into the mold 10, and has been prefabricated from 50 to 70 or more layers of a glass fibrous material. An external side of the root insert 20 is in direct contact with the internal side of the mold 10. The root insert 20 extends to the vicinity of the blade root end 14 of the mold 10, where its end forms the blade-root end of the finished wind turbine rotor blade part. The root insert 20 initially has a uniform thickness in the vicinity of the blade-root end 14, which then, starting at a second radius position 22, decreases in a wedge-shaped manner until the root insert 20 finally terminates at a third radius position 24.

Above the root insert 20 there is a distribution medium 26, shown as a broken line and extending in a longitudinal direction of the mold 10 over a part of the longitudinal section of the root insert 20 which is tapered, and extending somewhat beyond the first radius position 16 in a direction toward the blade tip end 18 of the mold 10.

Above the root insert 20 and the distribution medium 26 there are a plurality of outer root reinforcement layers 28. These are composed of a textile material and run from the blade-root end of the root insert 20 in a direction toward the blade tip end 18 of the mold to a fourth radius position 30 arranged further toward the blade tip than the blade-tip end of the root insert 20 at the third radius position 24, and than the blade-tip end of the first sprue channel 12 at the first radius position 16. Starting approximately at the third radius position 24, the total thickness of the outer root reinforcement layers 28 decreases until the fourth radius position 30 is reached. The tapering is achieved by successively reducing the number of the layers.

Above the outer root reinforcement layer 28, a prefabricated main spar cap 32 has been arranged, made of carbon fiber-reinforced material in the example. From its blade-root end 34 arranged at a distance from the blade-root end of the outer root reinforcement layer 28, to the blade-tip end of the outer root reinforcement layer 28 at the fourth radius position 30, the main spar cap 32 lies directly on the outer root reinforcement layer 28. Between the fourth radius position 30 and its end 36 arranged in the vicinity of the blade tip end 18 of the mold 10, the main spar cap 32 lies directly on the internal side of the mold 10. The gap discernible in the figure results from the technology used to produce the drawing. The main spar cap 32 tapers somewhat, starting from the third radius position 24 at which the root insert 20 terminates, in a direction toward its blade-root end 34. The main spar cap 32 also tapers toward its blade-tip end 36, but the figure does not show this.

A plurality of inner root reinforcement layers 38 are arranged above the main spar cap 32. These can extend over the same longitudinal region of the part as the exterior root reinforcement layers 28, but they can also be longer or shorter than the root reinforcements 28. Their total thicknesses decrease via successive layer diminution toward the fourth radius position 30, and this likewise applies similarly to the outer root reinforcement layers 28. In a short longitudinal section of the inner root reinforcement layers which is adjacent to the blade-root end, they have a uniform total thickness, increased via further additional layers in comparison with the other longitudinal sections.

Figure 2:
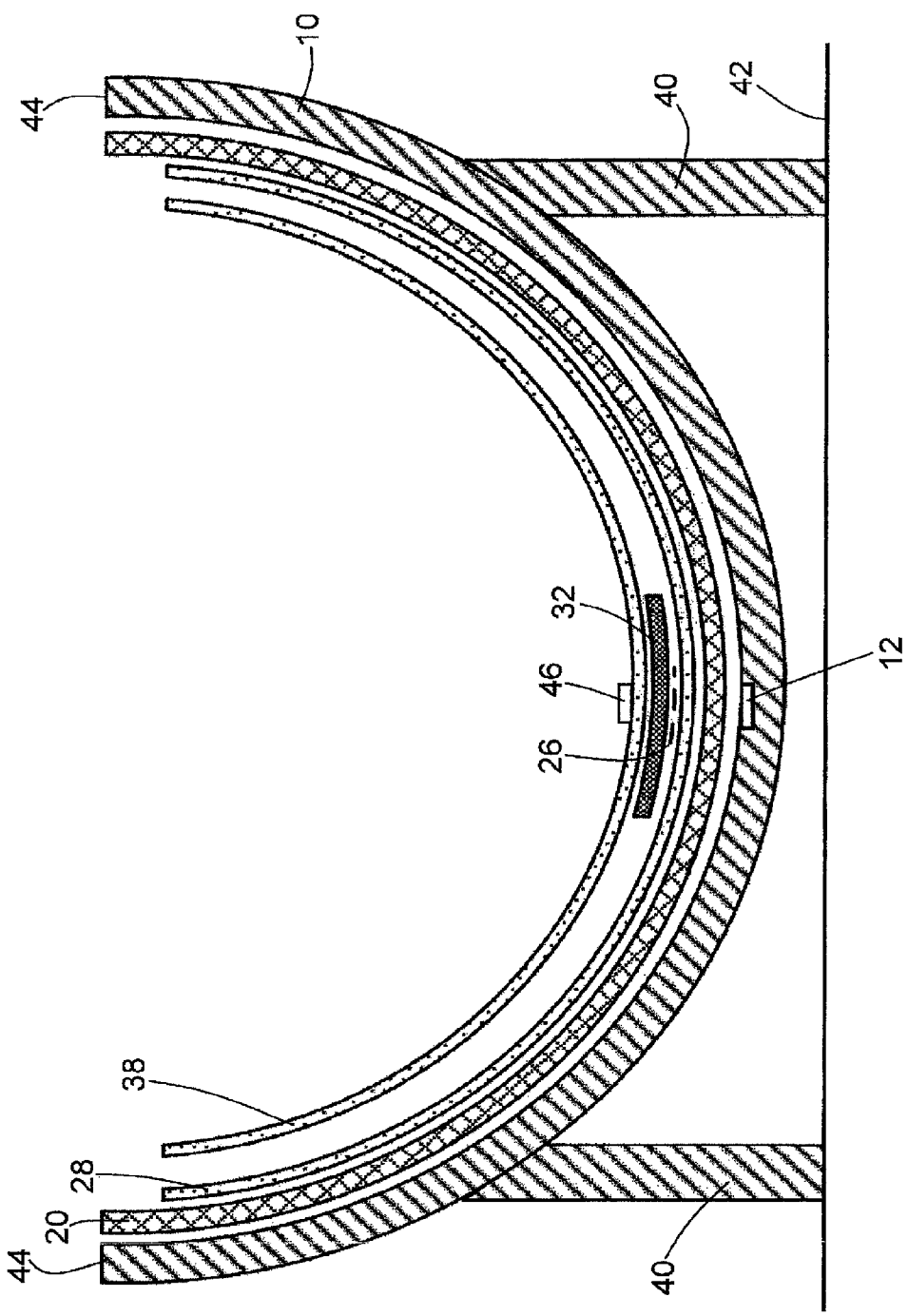

Further details of the configuration of the wind turbine rotor blade part of the invention can be discerned from FIG. 2, in which the same reference signs are used for the parts of FIG. 1. FIG. 2 shows a cross section through the plane indicated by A-A in FIG. 1. This planar section is in the vicinity of the blade root of the part, and the cross section of the part is semicircular, as is also the case directly at the blade root. The mold 10 is correspondingly also semicircular, and rests on two stands 40 on the floor 42 of an assembly hall.

It is easy to discern the first sprue channel 12 which is integrated into the internal side of the mold 10, in such a way that its outlet openings, not shown, terminate flush with the internal side of the mold 10. The first sprue channel 12 is located centrally below the main spar cap 32.

The root insert 20 has been inserted directly into the mold, and its cross section is likewise semicircular. Above this are the outer root reinforcement layers 28, on which the main spar cap 32 is arranged approximately in the center of the mold (in relation to the width). Between the root insert 20 and the outer root reinforcement layers 28, the distribution medium 26 is arranged, and in this depiction extends only over a part of the total width of the main spar cap 32, but can also be wider. Above the main spar cap 32 and laterally with respect thereto are the inner root reinforcement layers 38. Like the root insert 20, the root reinforcement layers 28, 38 extend in essence over the entire width of the mold 10, that means they form a semicircle extending to the vicinity of the lateral edges 44 of the mold. In the region of the lateral edges 44 of the mold 10 there are also the extraction channels, which are not shown.

The arrangement of the second sprue channel 46 has been depicted only in FIG. 2. This channel is located above the main spar cap 32, and its outlet openings, not shown in the figure, which are directed downward are adjacent to the inner root reinforcement layers 38. The first sprue channel 12 and the second sprue channel 46 each extend in a longitudinal direction of the mold 10.

It is understood that the foregoing description is that of the preferred embodiments of the invention and that various changes and modifications may be made thereto without departing from the spirit and scope of the invention as defined in the appended claims.

LIST OF REFERENCE CHARACTERS USED

10 Mold
12 First sprue channel
14 Blade root end of the mold 10
16 First radius position
18 Blade tip end of the mold 10
20 Root insert
22 Second radius position
24 Third radius position
26 Distribution medium
28 Outer root reinforcement layers
30 Fourth radius position
32 Main spar cap
34 Blade root end of the main spar cap
36 Blade tip end of the main spar cap
38 Inner root reinforcement layers
40 Stands of the mold 10
42 Floor 44 Edges of the mold 10
46 Second sprue channel

What is claimed is:

1. A method for making a wind turbine rotor blade part with a prefabricated main spar cap, the method comprising the steps of:
   providing a mold having a blade root end and a blade-tip end;
   inserting at least one outer root reinforcement layer made of a fibrous material into the mold;
   arranging the prefabricated main spar cap on the at least one outer root reinforcement layer;
   arranging, in the mold, at least one inner root reinforcement layer made of a fibrous material on the main spar cap;
   closing the mold;
   extracting air from the mold through at least one extraction channel arranged at a lateral distance from the main spar cap;
   feeding a liquid plastics material through a first sprue channel which has a plurality of outlet openings below the main spar cap; and,
   feeding a liquid plastics material through a second sprue channel which has a plurality of outlet openings above the main spar cap.

2. The method of claim 1, wherein the outlet openings of the first sprue channel are distributed centrally below the main spar cap and above a longitudinal section of the mold.

3. The method of claim 1, wherein a plurality of outer root reinforcement layers have been mutually superposed in a longitudinal section of the mold and have a total thickness of at least 1 mm.

4. The method of claim 2, wherein the longitudinal section extends over only a portion of the total length of the main spar cap.

5. The method of claim 1, wherein a plurality of inner and/or outer root reinforcement layers are mutually superposed, and the total thickness of each of these decreases in a longitudinal section of the wind turbine rotor blade part with increasing distance from the blade-root end.

6. The method of claim 1, wherein a thickness of the main spar cap in a longitudinal section of the wind turbine rotor blade part increases with increasing distance from the blade-root end.

7. A method for making a wind turbine rotor blade part with a prefabricated main spar cap, the method comprising the steps of:
   providing a mold having a blade root end and a blade-tip end;
   inserting at least one outer root reinforcement layer made of a fibrous material into the mold;
   arranging the prefabricated main spar cap on the at least one outer root reinforcement layer;
   arranging, in the mold, at least one inner root reinforcement layer made of a fibrous material on the main spar cap;
   closing the mold;
   extracting air from the mold through at least one extraction channel arranged at a lateral distance from the main spar cap;
   feeding a liquid plastics material through a first sprue channel which has a plurality of outlet openings below the main spar cap; and,
   feeding a liquid plastics material through a second sprue channel which has a plurality of outlet openings above the main spar cap, wherein the feeding through the second sprue channel is started only after expiration of a period after the start of the feeding through the first sprue channel.

8. A method for making a wind turbine rotor blade part with a prefabricated main spar cap, the method comprising the steps of:
   providing a mold having a blade root end and a blade-tip end;
   inserting at least one outer root reinforcement layer made of a fibrous material into the mold;
   arranging the prefabricated main spar cap on the at least one outer root reinforcement layer;
   arranging, in the mold, at least one inner root reinforcement layer made of a fibrous material on the main spar cap;
   closing the mold;
   extracting air from the mold through at least one extraction channel arranged at a lateral distance from the main spar cap;
   feeding a liquid plastics material through a first sprue channel which has a plurality of outlet openings below the main spar cap; and,
   feeding a liquid plastics material through a second sprue channel which has a plurality of outlet openings above the main spar cap, wherein the feeding through the second sprue channel is started only after expiration of a period after the start of the feeding through the first sprue channel, and the period is judged in such a way that the plastics material fed through the first sprue channel has become distributed below the main spar cap when the feeding though the second sprue channel is started.

9. The method of claim 1 further comprising the step of inserting a prefabricated root insert at the blade root end of the mold prior to the insertion of the at least one outer root reinforcement layer.

10. The method of claim 9, wherein the root insert and the main spar cap are arranged overlapping in a longitudinal section of the wind turbine rotor blade part.

11. The method of claim 9, wherein the root insert tapers with increasing distance from the blade root end in the longitudinal section in which the root insert overlaps with the main spar cap.

12. The method of claim 9 further comprising the step of arranging a distribution medium between the root insert and the main spar cap.

13. The method of claim 1 further comprising the step of inserting further layers of a fibrous material configured to form outer areas of the wind turbine rotor blade part into the mold.

14. The method of claim 13, wherein the further layers of a fibrous material are laterally adjacent to the main spar cap and the main spar cap here has lateral connecting sections with which the further layers are bonded.

15. The method of claim 9, further comprising the step of inserting further layers of a fibrous material configured to form outer areas of the wind turbine rotor blade part into the mold wherein the further layers are adjacent to a side of the root insert, said side being remote from the blade root end, and at said side the root insert has a connecting section with which the further layers are bonded.

* * * * *